(12) United States Patent
Huang et al.

(10) Patent No.: US 12,074,760 B2
(45) Date of Patent: Aug. 27, 2024

(54) PATH MANAGEMENT

(71) Applicant: INTERNATIONAL BUSINESS MACHINES CORPORATION, Armonk, NY (US)

(72) Inventors: Yan Huang, Beijing (CN); Heng Wang, Beijing (CN); Kai Feng, Beijing (CN); Zheng Lei An, Beijing (CN); Shuang Shuang Jia, Beijing (CN); Xiao Ling Chen, Beijing (CN); Guang Han Sui, Beijing (CN); Lei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/477,398

(22) Filed: Sep. 16, 2021

(65) Prior Publication Data
US 2023/0084206 A1  Mar. 16, 2023

(51) Int. Cl.
*H04L 41/0816* (2022.01)
*H04L 67/1031* (2022.01)

(52) U.S. Cl.
CPC ...... *H04L 41/0816* (2013.01); *H04L 67/1031* (2013.01)

(58) Field of Classification Search
None
See application file for complete search history.

(56) References Cited

U.S. PATENT DOCUMENTS

| | | | |
|---|---|---|---|
| 7,136,907 B1 | 11/2006 | Nordstrom et al. | |
| 7,290,168 B1 | 10/2007 | DeKoning | |
| 8,495,255 B2 | 7/2013 | Butler et al. | |
| 8,879,396 B2 | 11/2014 | Guay et al. | |
| 9,270,601 B2 | 2/2016 | Lin et al. | |
| 9,729,434 B2* | 8/2017 | Hathorn | H04L 45/42 |
| 10,678,433 B1* | 6/2020 | Kirkpatrick | G06F 3/0689 |
| 2005/0122911 A1 | 6/2005 | Beichter et al. | |
| 2008/0125903 A1* | 5/2008 | Naya | H04L 67/1097 700/121 |
| 2012/0113807 A1* | 5/2012 | Vasseur | H04L 47/726 370/230 |

(Continued)

OTHER PUBLICATIONS

"Multipathing", Sybase, SAP Company, Created Oct. 26, 2013, 2 pages. Infocenter.sybase.com/help/index.jsp?topic=/com.sybase.infocenter.dc30119.1570100/doc/html/ate1323472197295.html.

(Continued)

*Primary Examiner* — Younes Naji
(74) *Attorney, Agent, or Firm* — Jeffrey Ingalls

(57) ABSTRACT

Embodiments relate to methods, systems, and computer program products for path management in a processing system. In a method, in response to receiving a request for adding a target controlling unit into a processing system, a plurality of network nodes in the processing system are divided into a group of subnets based on a topology of the plurality of network nodes, the plurality of network nodes being connected to at least one controlling unit in the processing system. A workload estimation is determined, the workload estimation representing a workload to be caused by the target controlling unit to the processing system. A target subnet is selected from the group of subnets for connecting the target controlling unit into the processing system based on the workload estimation. With these embodiments, the target subnet may be selected in an automatic way such that the performance of the processing system may be increased.

18 Claims, 6 Drawing Sheets

(56) References Cited

U.S. PATENT DOCUMENTS

| 2014/0089912 A1* | 3/2014 | Wang ...................... G06F 8/65 |
| | | 717/173 |
| 2016/0277232 A1 | 9/2016 | Bogdanski et al. |
| 2017/0257326 A1* | 9/2017 | Bogdanski .............. H04L 45/04 |
| 2018/0097876 A1* | 4/2018 | Rolia ................. H04L 67/1076 |

OTHER PUBLICATIONS

"Hardware Configuration Definition User's Guide", IBM, Version 2, Release 1, printed May 28, 2021, 597 pages.

Tchendji et al., "Conflict-free rerouting scheme through flow splitting for virtual networks using switches", Journal of Internet Services and Applications (2018) 9:13, Published Date: Jul. 2, 2018, 15 pages.

Shao et al., "Network-Aware Data Placement Strategy in Storage Cluster System". Hindawi, Published Date: Apr. 21, 2020, Mathematical Problems in Engineering, vol. 2020, Article ID 5970583, 16 pages.

"Traffic Analytics", Microsoft Build, Published Date: Jun. 15, 2018, 357 pages. https://docs.microsoft.com/en-us/azure/network-watcher/traffic-analytics.

"Meraki SD-WAN", Cisco, 32 pages, printed May 28, 2021.

"LAN Design", Cisco Networking Academy, Dec. 1, 2017, 14 pages. https://www.ciscopress.com/articles/article.asp?p=2832408&seqNum=5.

Mell et al. "The NIST Definition of Cloud Computing", Special Publication 800-145, Sep. 2011, 7 pages, National Institute of Standards and Technology, Gaithersburg, MD.

\* cited by examiner

PATH MANAGEMENT

BACKGROUND

The present disclosure relates to path management, and more specifically, to methods, systems and computer program products for selecting a subnet in a processing for adding a controlling unit therein.

Network technologies promote developments for distributed processing systems. A processing system is not limited to a single location. Instead, the processing system may be distributed among one or more physical locations via a network including a plurality of network nodes. New controlling unit(s) may be added into the processing system for providing more processing resources to the processing system. Due to the network nodes having different performance characteristics, the new controlling unit may have different network transmission abilities, which in turn affects the total performance of the processing system. Therefore, selecting an appropriate location in the processing system for adding the new controlling unit becomes a focus.

SUMMARY

According to embodiments, there is provided a computer-implemented method that may be implemented by one or more processors. In the method, in response to receiving a request for adding a target controlling unit into a processing system, one or more processors divide a plurality of network nodes in the processing system into a group of subnets based on a topology of the plurality of network nodes, the plurality of network nodes being connected to at least one controlling unit in the processing system. One or more processors determine a workload estimation that is to be caused by the target controlling unit to the processing system. One or more processors select a target subnet from the group of subnets for connecting the target controlling unit into the processing system based on the workload estimation.

According to another embodiment, there is provided a computer-implemented system. The computer-implemented system comprises a computer processor coupled to a computer-readable memory unit, where the memory unit comprises instructions that when executed by the computer processor implements the above method.

According to another embodiment, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
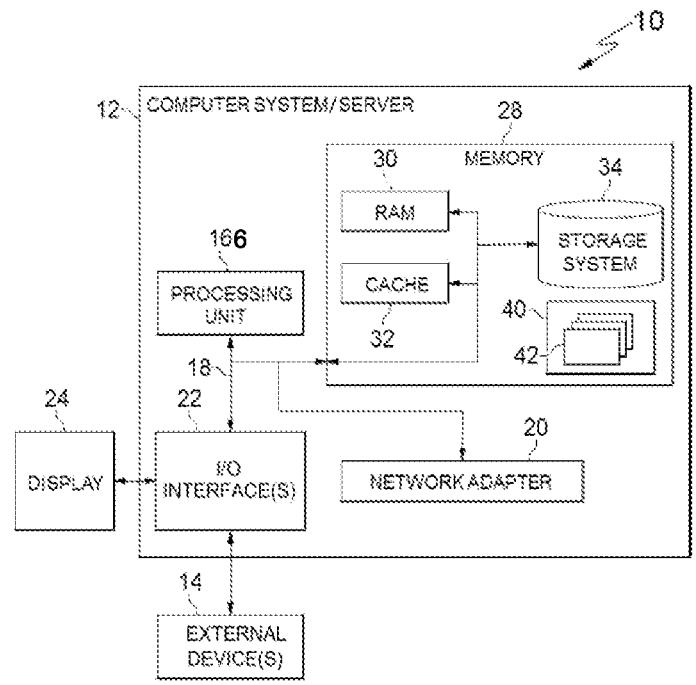
FIG. 1 depicts a cloud computing node, according to embodiments.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of the embodiments described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 166, a system memory 28, and a bus 18 that couples various system components including system memory 28 to processing units 166.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the present embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
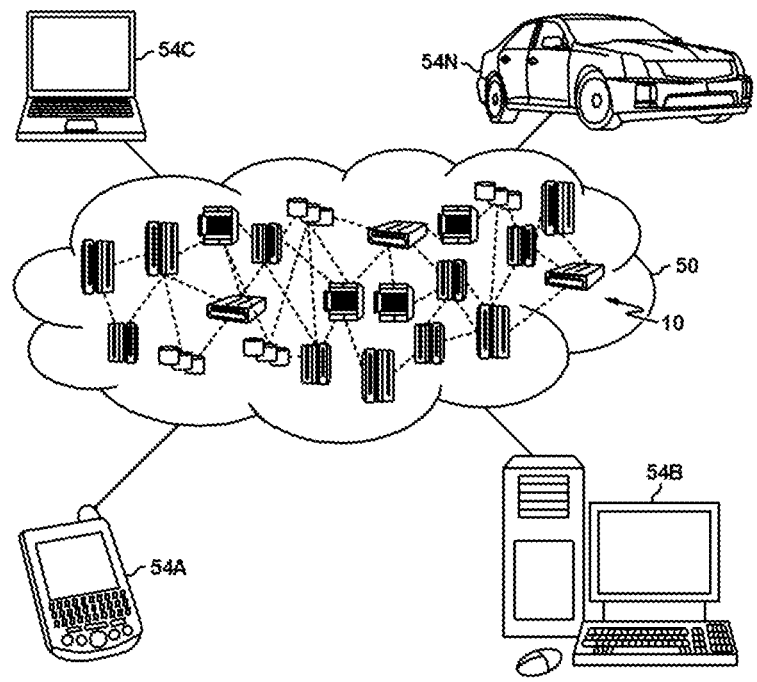
FIG. 2 depicts a cloud computing environment, according to embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
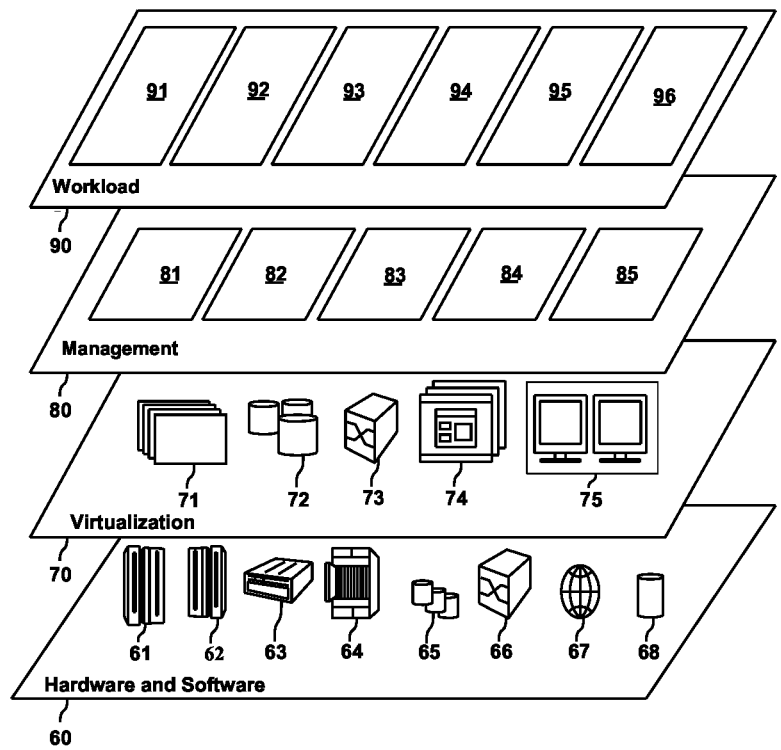
FIG. 3 depicts abstraction model layers, according to embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and the present embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and path processing 96.

It should be noted that the path processing 96 according to embodiments could be implemented by computer system/server 12 of FIG. 1.

Figure 4:
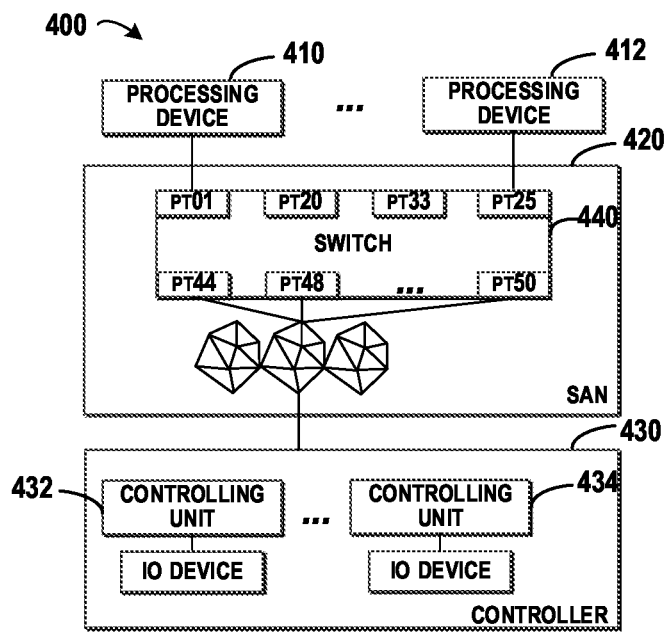
FIG. 4 depicts an example diagram of a processing system in which embodiments of the present disclosure may be implemented.

FIG. 4 depicts an example diagram of a processing system 400 in which embodiments may be implemented. As depicted in FIG. 4, the processing system 400 may be a distributed system including one or more processing devices 410 . . . 412, a storage area network (SAN) 420 and a controller 430. Here, the processing device 410 . . . 412 may be a physical device on which one or more virtual machine may be deployed. The SAN 420 may include a switch 440 and a plurality of other network nodes that are connected according to a predefined topology. The switch 440 may include multiple switch-in ports such as PT01, PT20, PT33, . . . , and PT25. Further, the switch 440 may also include multiple switch-out ports such as PT44, PT48, PT50. The controller 430 may include one or more controlling units, each of these controlling units may have corresponding 10 devices for providing physical processing resources to the processing system 400. For example, the controller 430 may include one or more controlling units 432 . . . 434.

In the processing system 400, each controlling unit 432 . . . 434 is connected in the processing system 400 via a Channel Path Identifier (CHPID). For example, the controlling unit 432 is connected via "CHPID: P0.0.00." Here, "CHPID: P0.0.00" represents a link path between the processing device 410 and the controlling unit 432, which includes the switch-in port PT01, the switch-out port PT 44, and one or more network nodes in the SAN 420. Similarly, the processing device 412 in the processing system 400 may be connected to the controlling unit 434 via "CHPID: P2.0.C2."

During operations of the processing system 400, resource shortage may occur in the processing system 400, and thus one or more controlling units may be added into the controller 430 of the processing system 400. As states of the plurality of network nodes in the SAN 420 may be significantly different, performance of the newly added controlling unit may vary when it is connected to different network nodes. At this point, it may be required to determine an appropriate location for connecting a new controlling unit into the processing system 400. Usually, an administrator of the processing system 400 should manually configure the link path for the new controlling unit based on his/her expertise and experience. However, sometimes the performance of the newly added controlling unit is not satisfied due to traffic changes in the SAN 420 and/or another reason. Therefore, how to connect the new controlling unit into the processing system 400 becomes a focus.

In view of the above effects, embodiments present disclosure provide an effective solution for adding a target controlling unit into the processing system 400.

Figure 5:
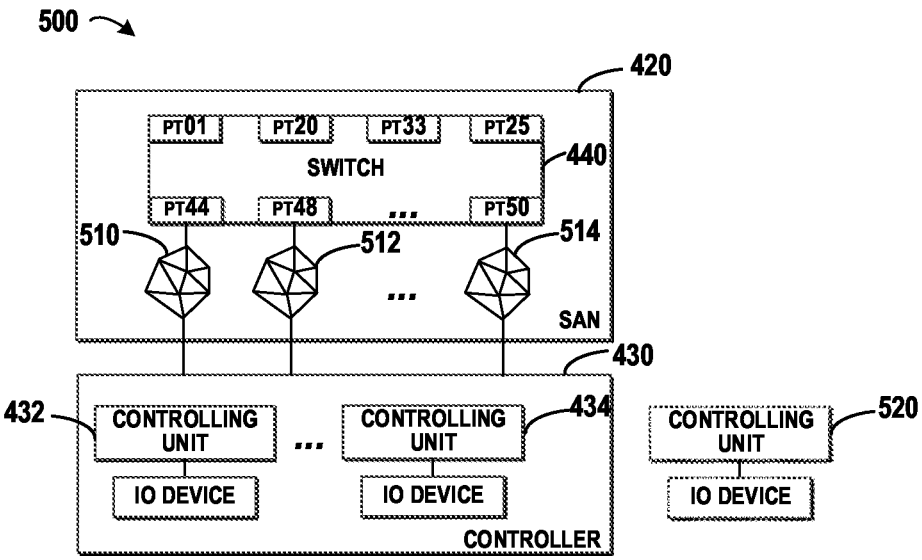
FIG. 5 depicts an example diagram for selecting a subnet for adding a controlling unit into the processing system, according to embodiments.

Referring now to FIG. 5, this figure depicts an example diagram 500 for selecting a subnet for adding a controlling unit 520 into the processing system 400 according to embodiments of the present disclosure. In FIG. 5, in order to add the controlling unit 520 into the processing system 400, the plurality of network nodes in the SAN 420 may be divided into a plurality of subnets 510, 512 . . . 514. Further, a workload estimation may be determined for the target controlling unit 520. Here, each of these subnets 510, 512, . . . , and 514 may have different workloads, and a subnet with a lower workload may be selected from the plurality of subnets 510, 512, . . . , and 514 for connecting the controlling unit 520 based on the workload estimation.

With these embodiments, static state information such as a topology of the SAN 420 may be used for obtaining the plurality of subnets 510, 512, . . . , and 514. Further, dynamic state information such as workloads for these subnets 510, 512 . . . 514 may be used to select an appropriate subnet. Specifically, a workload estimation that is to be caused by the controlling unit 520 may be determined based on the dynamic state information. Therefore, there is no requirement for the administrator to manually configure the link path for the controlling unit 520. Meanwhile, the controlling unit 520 may be connected to a subnet with better performance so as to ensure that the controlling unit 520 may have a fast transmission speed. Here, the above procedure may be implemented before the controlling unit 520 is added for selecting an appropriate subnet. Further, the above procedure may be implemented when or after the controlling unit 520 is added for evaluating states of subnets in the processing system 400. Alternatively and/or in addition to, the above procedure may be implemented in a simulation environment for an estimation purpose.

In some embodiments, a request may be received in the processing system 400 for adding the controlling unit 520 into the processing system 400. In response to the request, the plurality of network nodes in the processing system 400 may be divided into a group of subnets 510, 512 . . . 514 based on a topology of the plurality of network nodes. Here, the plurality of network nodes are in the SAN 420 and connected to the controlling units 432 . . . 434 in the processing system 400. Here, the subnet represents a portion in the SAN 420, which includes one or more network nodes among the plurality of network nodes. Hereinafter, reference will be made to FIG. 6 for more details about the subnet.

Figure 6:
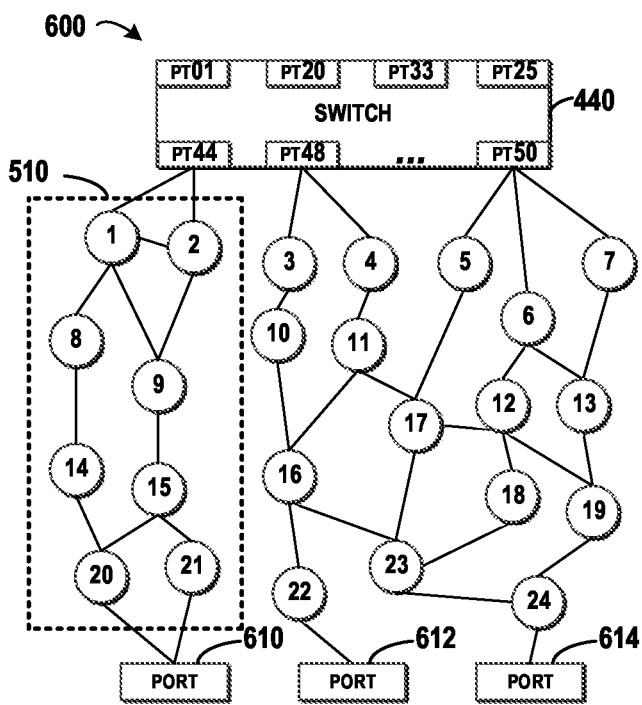
FIG. 6 depicts an example diagram of a subnet, according to embodiments.

FIG. 6 depicts an example diagram of a subnet according to embodiments. In FIG. 6, the SAN 420 includes multiple network nodes 1 to 24, and these network nodes 1 to 24 are connected according to the predefined topology. In some embodiments, the topology may be defined in an IODF (IO Definition File) format. Alternatively and/or in addition to, the topology may be saved in another format. In FIG. 6, the subnet 510 related to the switch-out port PT44 may be determined from the plurality of network nodes in the SAN 420, and the subnet 510 includes multiple network nodes 1, 2, 8, 9, 14, 15, 20 and 21 that are directly and/or indirectly connected to the switch-out port PT44. In other words, the subnet 510 includes network nodes that are connected to the downlink of the switch-out port PT44. Similarly, the subnet 512 (see, FIG. 5) may be determined for the switch-out port PT48, and the subnet 514 (see, FIG. 5) may be determined for the switch-out port PT50. In FIG. 6, the subnet is connected to one or more ports, for example, the subnet 510 is connected to the port 610, the subnet 512 is connected to the ports 612 and 614, and the subnet 514 is connected to the port 614.

In some embodiments, a history state of each of the subnets may be obtained from a log of the processing system 400. For example, the log may include multiple aspects of the network nodes in each subnet for a time range, and Table 1 illustrates an example log for the subnet 510 during a time range of 18:00 to 19:00.

TABLE 1

Example Log for Subnet

| Network Node | Device Type | Device Activity Rate | AVE Response Time | . . . |
|---|---|---|---|---|
| 1 | 33903 | 0.003 | 0.256 | . . . |
| 2 | 33903 | 0.013 | 0.608 | . . . |
| . . . | . . . | . . . | . . . | . . . |
| 21 | 33903 | 0.003 | 0.128 | . . . |

In Table 1, the first column represents all the network nodes 1, 2, 8, 9, 14, 15, 20 and 21 in the subnet 510, the second column represents a type of each network node, the third column represents an activity rate of each network node, and the fourth column represents an average response time for each network node. It is to be understood that the above Table 1 is just an example log for one time range, alternatively and/or in addition to, the log may have more or less aspects for each network node in the subnet. Further, a workload for the time range 18:00 to 19:00 may be determined for each subnet based on Table 1, and Table 2 shows an example workload distribution for the multiple subnets during multiple time ranges.

TABLE 2

Example Workload Distribution

| Time Range | Subnet 510 | Subnet 512 | Subnet 514 |
|---|---|---|---|
| 18:00-19:00 | 0.013 | 0.009 | 0.001 |
| 19:00-20:00 | 0.001 | 0.002 | 0.014 |
| . . . | | | |
| 22:00-23:00 | 0.001 | 0.001 | 0.003 |
| 23:00-24:00 | 0.001 | 0.001 | 0.003 |

In Table 2, the first column represents a time range of the workload, and the following columns represent workloads for the subnets 510, 512 and 514. Here, a maximum device activity rate for a network device in the subnet may be used for determining the workload. For example, the device activate rate of the network node 2 has the maximum value "0.013," and thus the workload for the subnet 510 during 18:00-19:00 may be represented by "0.013." Alternatively and/or in addition to, the workload may be determined based on a weighted sum of other aspects in the log. It is to be understood that Table 1 and Table 2 only illustrate the log and the workload distribution for the subnet 510, logs and workload distributions for the other subnets 512 . . . 514 may be obtained in a similar manner and details will be omitted hereinafter.

Sometimes, the workloads for all the subnets 510, 512 . . . 514 may be low (for example, lower than a predefined threshold subnet workload), and then a target subnet may be randomly selected from these subnets for connecting the target controlling unit 520. Alternatively and/or in addition to, a target subnet with the minimum workload may be selected. In some embodiments, if the workloads for all the subnets 510, 512 . . . 514 are above the predefined threshold subnet workload, then a workload estimation may be determined for the controlling unit 520. Here, the workload estimation represents an estimated workload that is to be caused by the controlling unit 520 to the processing system 400. As the controlling units in the processing system 400 may have different features, the workloads for these controlling units 432 . . . 434 are different and thus these controlling units may provide different contributions to a total workload for the subnet. Therefore, in order to determine the workload estimation for the controlling unit 520 in an accurate way, a similar controlling unit may be selected from the controlling units 432 . . . 434 based on a similarity comparison.

It is to be understood that the workloads are different among different time ranges, and thus a time range when the to-be-added controlling unit 520 will have a higher workload may be determined first based on based on the similarity comparison. Specifically, various features (such as a function, a model type, a storage volume, a bandwidth, and so on) may be used to determine the similar controlling unit. In one example, assuming that the controlling unit 432 works as a backup server that usually has a heavy workload during the night time (for example, 23:00-24:00), and the controlling unit 434 works as a computing server that usually has a heavy workload during the day time, if the function of the to-be-added controlling unit 520 is a backup server, then the controlling unit 432 may be selected as the similar controlling unit. Here, the similar controlling unit may provide a reference for determining the workload estimation for the controlling unit 520. Further, the similar controlling unit may also specify the time range 23:00-24:00, and then the workloads during the time range 23:00-24:00 may be used for further processing.

It is to be understood that the above paragraph provides one example procedure for determining the similar controlling unit. Alternatively, and/or in addition to, the similar controlling unit may be determined based on various features of the controlling units. Once the similar controlling unit is determined, the workload estimation may be determined for the controlling unit 520 based on a workload of the similar controlling unit. For example, an average workload during a specified time range may be obtained from the log of the processing system 400, and then the workload estimation may be represented by the average workload. With these embodiments, the workload estimation may be determined in an easy and effective way.

Further, the workload estimation may be used to determine influences caused by the controlling unit 520 when the controlling unit 520 is added into the processing system 400, such that a target subnet may be selected from the plurality of subnets 510, 512 . . . 514. In some embodiments, if the workload estimation is below a predefined threshold workload, it means that adding the controlling unit 520 in to any subnet may not leads to great influences to the SAN 420. Therefore, a subnet may be randomly selected from the group of subnets 510, 512 . . . 514. If the workload estimation is above the predefined threshold workload, it means that the influences caused by adding the controlling unit 520 cannot be neglected. Therefore, further processing may be implemented based on the workload estimation for selecting the target subnet.

In some embodiments, a flow rate may be determined for each of the subnets 510, 512, . . . , and 514. Here, the flow rate indicates a workload of the subnet. For example, a bandwidth usage rate may be used for representing the flow rate. Alternatively and/or in addition to, other parameters related to the network nodes in the subnet may be used for representing the flow rate. In some embodiments, one or more hot nodes may be identified from the network node(s) that is included in each subnet based on traffic information for each subnet. Here, a threshold may be defined for identifying the hot node, for example, if the traffic related to a network node exceeds 100 Mbps (or another value), the network node may be identified as a hot node. In some embodiments, the traffic may be normalized into a range of [0, 100], and the threshold may be defined as 50 or another value. Here, the threshold "50" indicates that if the bandwidth usage rate of a network node is above 50%, the network node is identified as a hot node.

Figure 7:
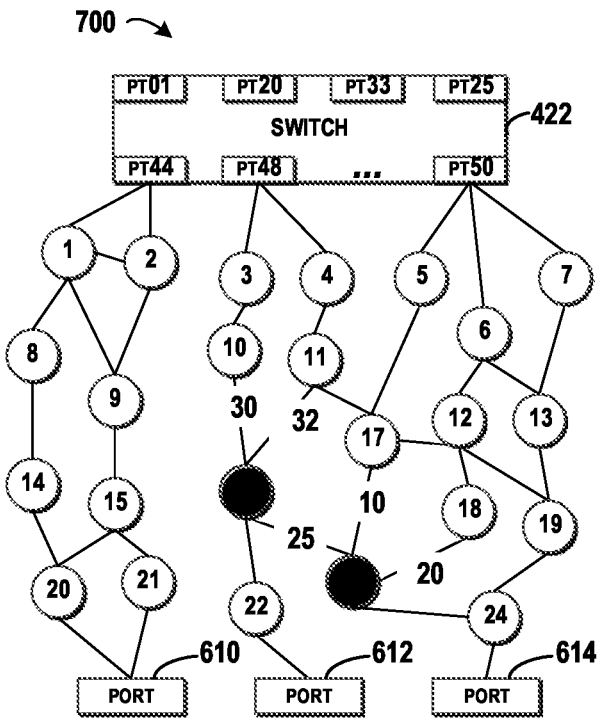
FIG. 7 depicts an example diagram for determining one or more hot nodes in each of a plurality of subnets, according to embodiments.

Referring now to FIG. 7, this figure depicts an example diagram 700 for determining one or more hot nodes in each of a plurality of subnets according to embodiments, where the network nodes 16 and 23 shown with the shaded pattern represent the hot nodes. In FIG. 7, a value shown at a link between two network nodes represents a normalized traffic value. For example, the value "30" between the network nodes 10 and 16 indicates that the current data transmission costs 30% of the bandwidth, and the value "32" between the network nodes 11 and 16 indicates that the current data transmission costs 32% of the bandwidth. Therefore, the flow rate for the network node 16 may be determined as 30+32=62. Similarly, the flow rate for the network node 23 may be determined as 25+10+20=55. Due to both of the above two flow rates exceeding 50, the two network nodes 16 and 23 are identified as the hot nodes.

Figure 8:
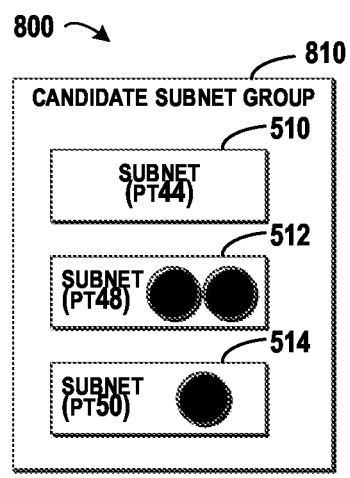
FIG. 8 depicts an example diagram for filtering a candidate subnet group, according to embodiments.

In some embodiments, a candidate subnet group may be defined, where the candidate subnet group includes all the candidate subnets that may be used for connecting the controlling unit 520. FIG. 8 depicts an example diagram 800 for filtering a candidate subnet group according to embodiments. In FIG. 8, the candidate subnet group 810 may include all the subnets 510, 512 . . . 514 at the beginning. In FIG. 8, the subnet 510 includes no hot node, the subnet 512 includes two hot nodes 16 and 23, and the subnet 514 includes one hot node 23. Further, unqualified subnet(s) may be removed from the candidate subnet group 810 based on a traffic estimation for the hot node(s).

In some embodiments, the traffic estimation may be determined for each hot node based on the original traffic of the hot node (when the controlling unit 520 is not added) and the traffic caused by adding the controlling unit 520.

Figure 9:
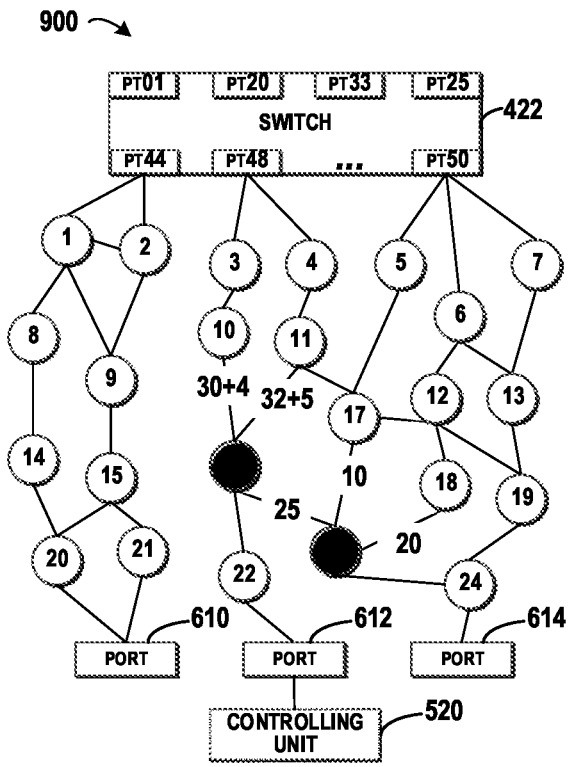
FIG. 9 depicts an example diagram for determining a workload estimation for a hot node, according to embodiments.

Referring to FIG. 9, this figure depicts an example diagram 900 for determining a workload estimation of a hot node according to embodiments. If the controlling unit 520 is connected to the subnet 510, the traffic of all the hot nodes 16 and 23 do not change. FIG. 9 shows a situation where the controlling unit 520 is connected into the subnet 512, and the flow rates for the hot nodes in the subnet 512 may increase. Assuming that the increments for the flow rates caused by adding the controlling unit 520 into the subnet 512 are 4 and 5, then the flow rate for the link between the network nodes 10 and 16 may be determined as 30+4=34, and the flow rate for the link between the network nodes 11 and 16 may be determined as 32+5=37. Therefore, the traffic estimation for the hot node 16 may be 34+37=71.

In some embodiments, a threshold may be predefined for example to 70 (or another value). Due to the traffic estimation being above the predefined threshold (71>70), the subnet 512 should be removed from the candidate subnet group 810. It is to be understood that the above example diagram 900 shows a procedure for determining the traffic estimation for only one hot node, other hot nodes may be subjected to similar processing, such that a traffic estimation may be determined for each of the hot nodes. In some embodiments, the threshold may be set to a different value. For example, if the threshold is defined to 75, then the traffic estimation for the other hot node 23 in the subnet 512 may be compared with the threshold. If the traffic estimations for all the hot nodes 16 and 23 are below the threshold, the subnet 512 may be maintained in the candidate subnet group 810. If the traffic estimation for any of the hot nodes 16 and 23 is below the threshold, the subnet 512 may be removed from the candidate subnet group 810.

In some embodiments, the above procedure in FIG. 9 may be implemented to all the subnets. For example, traffic estimations may be determined when the controlling unit 520 is connected to the subnet 514. Based on a similar procedure, if a traffic estimation for one hot node exceeds the predefined threshold, a subnet that includes the hot node may be removed from the candidate subnet group 810. The above procedure may be repeated until all the subnets are processed. With these embodiments, the unqualified subnet (including a hot node with an unacceptable flow rate) may be removed from the candidate subnet group 810.

In some embodiments, one or more subnets may be removed from the candidate subnet group 810 while the candidate subnet group still includes at least one subnet. At this point, the target subnet may be selected from the candidate subnet group 810. Supposing the subnet 512 is removed from the candidate subnet group 810, and the candidate subnet group 810 includes the subnets 510 and 514, the target subnet may be selected in a random way. Preferably, the subnet 510 that includes no hot node may be selected. Alternatively and/or in addition to, the target subnet may be selected based on a traffic estimation for a hot node in the target subnet. For example, a maximum value among traffic estimations for all the hot nodes in the subnet may be used as a workload indicator for the subnet. Therefore, a subnet with the lowest workload indicator may be selected as the target subnet. With these embodiments, the target subnet with the best performance may be selected for connecting the controlling unit 520.

In some embodiments, there is a possibility that all the subnets are removed from the candidate subnet group 810, at this point the target subnet may be selected based on an average traffic for each subnet in the group of subnets 510, 512 . . . 514. Specifically, traffic estimations may be determined for all the network nodes in the subnet, and then the average traffic may be determined for the subnet. Further, a subnet that has the lowest average traffic may be selected as the target subnet. In this situation, although the target does not have the desired performance, it is the best one in SAN 420. Therefore, the target subnet may be selected effectively from the SAN 420 in a simple way.

Figure 10:
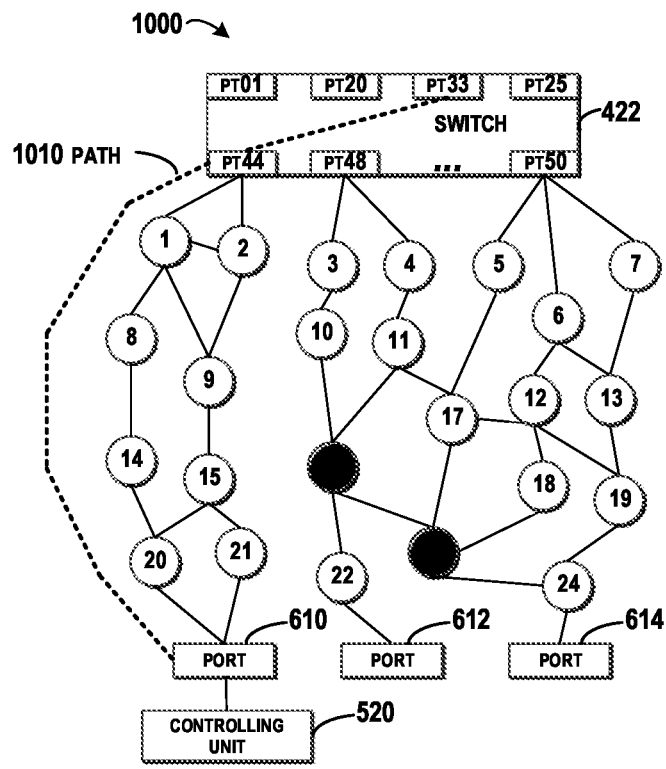
FIG. 10 depicts an example diagram of a path in a processing system, according to embodiments.

In some embodiments, the controlling unit 520 may be connected into the selected target subnet, and then the controlling unit 520 may communicate with other devices in the processing system 400. Assuming that the controlling unit 520 is connected into the subnet 510, a CHPID may be assigned for a path that leads to the controlling unit 520. FIG. 10 depicts an example diagram 1000 of a path in a processing system according to embodiments. In FIG. 10, the controlling unit 520 may be connected to a port 610 for the subnet 510, therefore a path 1010 may be generated in the processing system 400 for communications with the controlling unit 520. Further, a unique CHPID may be assigned to the path 1010, here the path 1010 includes the switch-in port of the switch 422, the switch-out port of the switch 422, the subnet 510, the port 610 and the controlling unit 520. It is to be understood that the path 1010 is just an example for communicating with the controlling unit 520, in another embodiment, the path 1010 may include other network nodes in the subnet 510.

Once the controlling unit 520 is added into the processing system 400 via the CHPID, a connection may be established between the switch 422 and the controlling unit 520. For example, a processing device that is connected to the switch-in port PT33 may access various resources controlling unit 520 via the CHPID. Therefore, the controlling unit 520 is merged into the processing system 400 for providing processing resources.

With these embodiments, a target subnet with a relative lighter workload may be selected from the SAN 420 for connecting the target controlling unit. Compared with existing solutions by defining the network configuration based on the administrator's experience, embodiments provide automatic solutions for selecting the target subnet, which may free the administrator from heavy manual works. Further, the present embodiment considers both of the static topology of the SAN 420 as well as the dynamic workload of the network nodes in the SAN 420, therefore the target subnet may be selected in a more accurate and effective way.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

Figure 11:
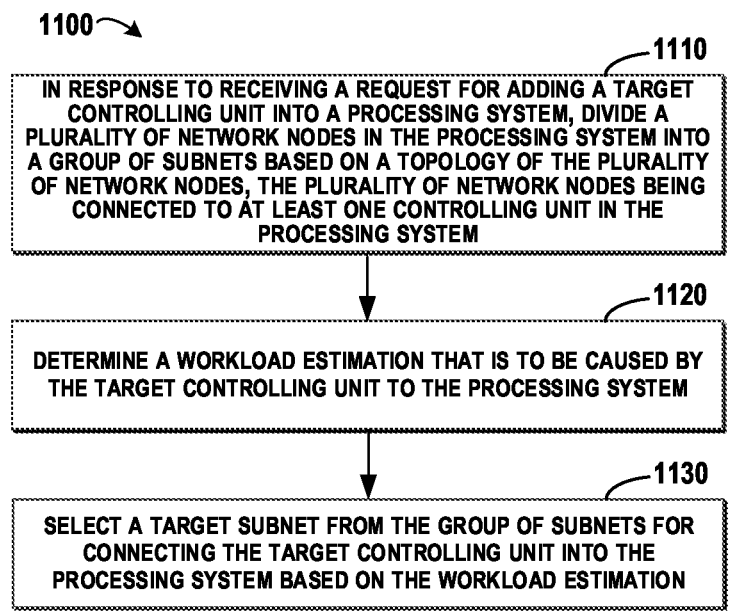
FIG. 11 depicts an example flowchart of a method for selecting a subnet for adding a controlling unit into a processing system, according to embodiments.

Referring now to FIG. 11, this figure depicts an example flowchart of a method 1100 for selecting a subnet for adding a controlling unit into a processing system according to embodiments. At operation 1110, in response to receiving a request for adding a target controlling unit into a processing system, a plurality of network nodes in the processing system is divided into a group of subnets based on a topology of the plurality of network nodes, the plurality of network nodes being connected to at least one controlling unit in the processing system. At operation 1120, a workload estimation is determined, the work estimation representing a workload that is to be caused by the target controlling unit to the processing system. At operation 1130, a target subnet is selected from the group of subnets for connecting the target controlling unit into the processing system based on the workload estimation.

In some embodiments, in order to determine the workload estimation, a controlling unit is selected from the at least one controlling unit based on at least one similarity level between the target controlling unit and the at least one unit; and then the workload estimation is determined for the target controlling unit based on a workload for the selected controlling unit. In some embodiments, the workload estimation is determined in response to determining that a plurality of workloads for the plurality of subnets are above a predefined threshold, respectively. In some embodiments, the subnet is selected as the target subnet in response to determining that a workload for a subnet in the plurality of subnets is below the predefined threshold. In some embodiments, a subnet is selected from the group of subnets in response to the workload estimation being below a predefined threshold workload, selecting. In some embodiments, the target subnet is selected from the group of subnets based on a flow rate for a subnet in the group of subnets in response to the workload estimation being above a predefined threshold workload.

In some embodiments, the group of subnets are updated by removing an unqualified subnet from the group of subnets based on traffic information for the unqualified subnet, and then the target subnet is selected from the updated group of subnets. In some embodiments, with respect to a given subnet in the group of subnets, a hot node is identified from at least one network node that is included in the given subnet based on traffic information for the given subnet. Then, a traffic estimation is determined for the hot node when the target controlling unit is connected to the given subnet. Next, the given subnet is removed from the group of subnets in response to the traffic estimation being above a predefined threshold traffic, removing. In some embodiments, the target subnet is selected based on a traffic estimation for a hot node in a subnet in the updated group of subnets in response to determining that the updated group of subnets includes at least one subnet. In some embodiments, the target subnet is selected based on an average traffic for each subnet in the group of subnets in response to determining that the updated group of subnets includes no subnet.

In some embodiments, the target subnet is connected to a switch-out port in a switch device in the processing system. In some embodiments, a path identification is assigned for a path, and the path includes a switch-in port in the switch device, the switch-out port, the subnet, and the target controlling unit. In some embodiments, a connection is established between the switch device and the target controlling unit based on the path identification.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a request for adding a target controlling unit into a processing system, the target controlling unit configured to provide physical processing resources to the processing system, and the processing system including at least one processor, a storage area network connected to the at least one processor, and a controller connected to the storage area network that includes at least one controlling unit;
   in response to receiving the request, dividing, by one or more processors, a plurality of network nodes in the storage area network into a group of subnets based on a topology of the plurality of network nodes, the plurality of network nodes being connected to the at least one controlling unit in the processing system;
   determining, by the one or more processors, a workload estimation for each subnet of the group of subnets that is to be caused by adding the target controlling unit to the processing system; and
   removing, by the one or more processors, an unqualified subnet from the group of subnets to form an updated group of subnets, the unqualified subnet including at least one hot node having a traffic estimation above a predefined traffic threshold when the target controlling unit is connected to the unqualified subnet.

2. The method of claim 1, wherein determining the workload estimation comprises:
   selecting, by the one or more processors, a controlling unit from the at least one controlling unit based on at least one similarity level between the target controlling unit and the at least one controlling unit; and
   determining, by the one or more processors, a workload estimation for the target controlling unit based on a workload for the selected controlling unit.

3. The method of claim 1, wherein the method further comprises:
   in response to determining that a workload estimation for one of the subnets in the updated group of subnets is below a predefined workload threshold, selecting, by the one or more processors, the one of the subnets in the updated group of subnets as a target subnet for connecting to the target controlling unit.

4. The method of claim 1, further comprising:
   selecting a target subnet to connect to the target controlling unit,
   wherein selecting the target subnet comprises any of:
     in response to a workload estimation for one of the subnets in the updated group of subnets being below a predefined workload threshold, selecting, by the one or more processors, the one of the subnets from the updated group of subnets as the target subnet; and
     in response to a workload estimation for one of the subnets in the updated group of subnets being above the predefined workload threshold, selecting, by the one or more processors, the target subnet from the updated group of subnets based on a flow rate for one of the subnets in the updated group of subnets.

5. The method of claim 1, further comprising:
   determining whether the updated group of subnets includes at least one subnet; and
   in response to determining that the updated group of subnets includes at least one subnet, selecting, by the one or more processors, a target subnet from the updated group of subnets for connecting the target controlling unit into the processing system based on the workload estimations of the group of subnets.

6. The method of claim 1, further comprising:
   determining whether the updated group of subnets includes at least one subnet; and
   in response to determining that the updated group of subnets includes at least one subnet, selecting, by the one or more processors, a target subnet for connecting to the target controlling unit based on a traffic estimation for a hot node in the at least one subnet in the updated group of subnets.

7. The method of claim 1, further comprising:
   determining whether the updated group of subnets includes at least one subnet; and
   in response to determining that the updated group of subnets includes no subnet, selecting, by the one or more processors, a target subnet for connecting to the target controlling unit based on an average traffic for each subnet in the group of subnets.

8. The method of claim 1, further comprising:
   selecting a target subnet to connect to the target controlling unit, wherein the target subnet is connected to a switch-out port in a switch device in the processing system; and assigning, by the one or more processors, a path identification for a path, the path including a switch-in port in the switch device, the switch-out port, the target subnet, and the target controlling unit.

9. The method of claim 8, further comprising:
establishing, by the one or more processors, a connection between the switch device and the target controlling unit based on the path identification.

10. A system comprising:
one or more computer readable storage media with program instructions collectively stored on the one or more computer readable storage media; and
one or more processors configured to execute the program instructions to perform a method comprising:
receiving a request for adding a target controlling unit into a processing system, the target controlling unit configured to provide physical processing resources to the processing system, and the processing system including at least one processor, a storage area network connected to the at least one processor, and a controller connected to the storage area network that includes at least one controlling unit;
in response to receiving the request, dividing a plurality of network nodes in the storage area network into a group of subnets based on a topology of the plurality of network nodes, the plurality of network nodes being connected to the at least one controlling unit in the processing system;
determining a workload estimation for each subnet of the group of subnets that is to be caused by adding the target controlling unit to the processing system; and
removing an unqualified subnet from the group of subnets to form an updated group of subnets, the unqualified subnet including at least one hot node having a traffic estimation above a predefined traffic threshold when the target controlling unit is connected to the unqualified subnet.

11. The system of claim 10, wherein determining the workload estimation comprises:
selecting a controlling unit from the at least one controlling unit based on at least one similarity level between the target controlling unit and the at least one controlling unit; and
determining a workload estimation for the target controlling unit based on a workload for the selected controlling unit.

12. The system of claim 10, wherein the method further comprises:
in response to determining that a workload estimation for one of the subnets in the updated group of subnets is below a predefined workload threshold, selecting the one of the subnets in the updated group of subnets as a target subnet for connecting to the target controlling unit.

13. The system of claim 10, further comprising:
selecting a target subnet to connect to the target controlling unit,
wherein selecting the target subnet comprises any of:
in response to a workload estimation for one of the subnets in the updated group of subnets being below a predefined workload threshold, selecting the one of the subnets from the updated group of subnets as the target subnet; and
in response to a workload estimation for one of the subnets in the updated group of subnets being above the predefined workload threshold, selecting the target subnet from the updated group of subnets based on a flow rate for one of the subnets in the updated group of subnets.

14. The system of claim 10, further comprising:
determining whether the updated group of subnets includes at least one subnet; and
in response to determining that the updated group of subnets includes at least one subnet, selecting a target subnet from the updated group of subnets for connecting the target controlling unit into the processing system based on the workload estimations of the group of subnets.

15. A computer program product comprising:
one or more computer readable storage media, and program instructions collectively stored on the one or more computer readable storage media, the program instructions executable by one or more processors to cause the one or more processors to perform actions comprising:
receiving a request for adding a target controlling unit into a processing system, the target controlling unit configured to provide physical processing resources to the processing system, and the processing system including at least one processor, a storage area network connected to the at least one processor, and a controller connected to the storage area network that includes at least one controlling unit;
in response to receiving the request, dividing a plurality of network nodes in the storage area network into a group of subnets based on a topology of the plurality of network nodes, the plurality of network nodes being connected to the at least one controlling unit in the processing system;
determining a workload estimation for each subnet of the group of subnets that is to be caused by adding the target controlling unit to the processing system; and
removing an unqualified subnet from the group of subnets to form an updated group of subnets, the unqualified subnet including at least one hot node having a traffic estimation above a predefined traffic threshold when the target controlling unit is connected to the unqualified subnet.

16. The computer program product of claim 15, wherein determining the workload estimation comprises:
selecting a controlling unit from the at least one controlling unit based on at least one similarity level between the target controlling unit and the at least one controlling unit; and
determining a workload estimation for the target controlling unit based on a workload for the selected controlling unit.

17. The computer program product of claim 15, wherein the actions further comprise:
selecting a target subnet to connect to the target controlling unit,
wherein selecting the target subnet comprises any of:
in response to a workload estimation for one of the subnets in the updated group of subnets being below a predefined workload threshold, selecting the one of the subnets from the updated group of subnets as the target subnet; and
in response to a workload estimation for one of the subnets in the updated group of subnets being above the predefined workload threshold, selecting the target subnet from the updated group of subnets based on a flow rate for one of the subnets in the updated group of subnets.

18. The computer program product of claim 15, wherein the actions further comprise:
- determining whether the updated group of subnets includes at least one subnet; and
- in response to determining that the updated group of subnets includes at least one subnet,
- selecting a target subnet from the updated group of subnets for connecting the target controlling unit into the processing system based on the workload estimations of the group of subnets.

* * * * *